E. W. BULLARD.
BIT BRACE HANDLE.
APPLICATION FILED SEPT. 13, 1920.
1,388,924.
Patented Aug. 30, 1921.
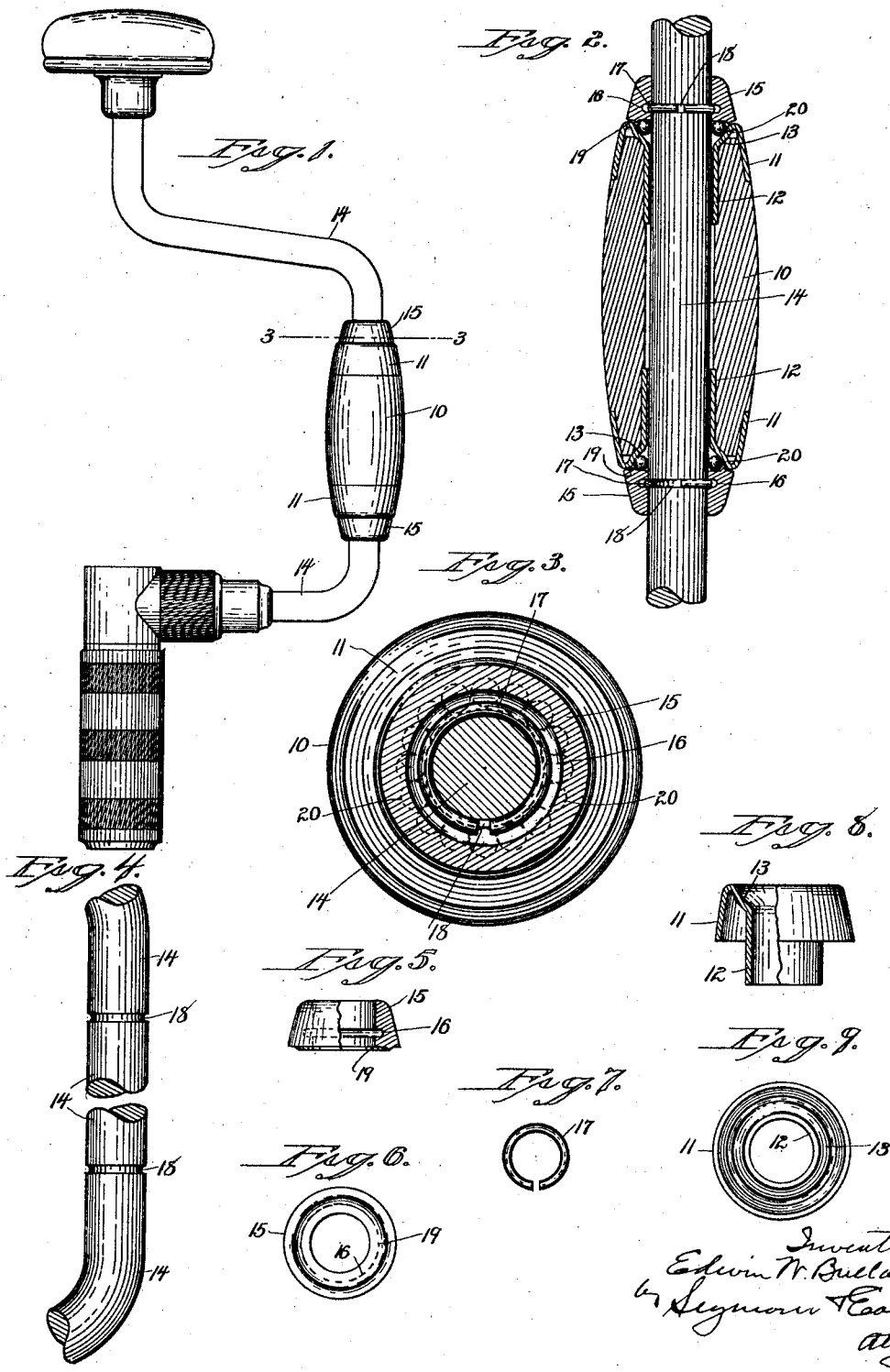

UNITED STATES PATENT OFFICE.

EDWIN W. BULLARD, OF WHITNEYVILLE, CONNECTICUT, ASSIGNOR TO WINCHESTER REPEATING ARMS CO., OF NEW HAVEN, CONNECTICUT, A CORPORATION.

BIT-BRACE HANDLE.

1,388,924.     Specification of Letters Patent.     Patented Aug. 30, 1921.

Application filed September 13, 1920. Serial No. 409,856.

*To all whom it may concern:*

Be it known that I, EDWIN W. BULLARD, a citizen of the United States, residing at Whitneyville, in the county of New Haven and State of Connecticut, have invented a new and useful Improvement in Bit-Brace Handles; and I do hereby declare the following, when taken in connection with the accompanying drawings, and the characters of reference marked thereon, to be a full, clear, and exact description of the same, and which said drawings constitute part of this application, and represent, in—

Figure 1, a view in side elevation of a bit-brace provided with my improved handle.

Fig. 2, an enlarged view showing the handle in longitudinal section with the central portion of the crank of the brace in elevation and broken away.

Fig. 3, an enlarged view in transverse section on the line 3—3 of Fig. 1.

Fig. 4, a broken view of the central portion of the crank showing its positioning-grooves.

Fig. 5, a detached view partly in elevation and partly in section of one of the two handle-positioning raceway collars.

Fig. 6, a reverse plan view thereof.

Fig. 7, a detached plan view of one of the resilient split collar-retaining-rings.

Fig. 8, a detached view partly in elevation and partly in section of one of the combined ferrule, bushing and raceways.

Fig. 9, a reverse plan view thereof.

My invention relates to an improvement in bit-brace handles, the object being to provide a simple and reliable means for positioning a handle of the anti-friction bearing type upon the crank of a bit-brace.

With these ends in view my invention consists in a bit-brace handle having certain details of construction and combinations of parts as will be hereinafter described and pointed out in the claim.

In carrying out my invention as herein shown, I employ a handle 10 furnished at its respective ends with one-piece sheet-metal fittings each comprising a ferrule 11, a bushing 12 and a raceway 13 interposed between the same. Such a handle is positioned upon the central portion of the crank 14 by means of two tapering handle-positioning and raceway collars 15 each formed with an internal circumferential groove 16 for the reception of a resilient split retaining ring 17 also partly entering circumferential positioning-grooves 18 formed in the crank 14 and separated from each other by the length of the handle with an allowance for the width of the said collars. Each of the collars is also formed upon its inner face with a raceway 19 for co-action with the raceways 13 described and with the surface of the crank in receiving and confining groups of anti-friction balls 20 as clearly shown in Fig. 2.

In installing the handle 10 upon the crank 14 it is slipped over the same prior to the bending thereof. When the several parts are properly assembled the retaining-rings 17 of the collars 15 are partly located within the grooves 16 of the collars and partly within the grooves 18 of the crank, whereby the handle is held against longitudinal movement but left free to revolve, the said rings and grooves being adapted in size and depth so that when the rings are finally in place they project into both sets of grooves.

I claim:

In a bit-brace, the combination with a crank, of a handle applied thereto, two complementary, combined, one-piece, sheet-metal bushings and flaring ferrules applied to the respective ends of the handle and each shaped to produce at the juncture of its bushing and ferrule an integral raceway angularly disposed between them, two retaining-collars fastened to the crank at the opposite ends of the handle in position for the coaction of their inner faces with the said raceways of the combined bushings and ferrules, means for securing the said collars in place, and antifriction balls located in the channels formed by the said raceways, retaining-collars and crank.

In testimony whereof, I have signed this specification in the presence of two subscribing witnesses.

EDWIN W. BULLARD.

Witnesses:
ERIK S. PALMER,
A. E. HODGSON.